May 27, 1958 E. A. SCHONROCK 2,836,316
BULK MATERIAL COMPACTOR FOR REFUSE TRUCKS
Filed May 12, 1955 5 Sheets-Sheet 2
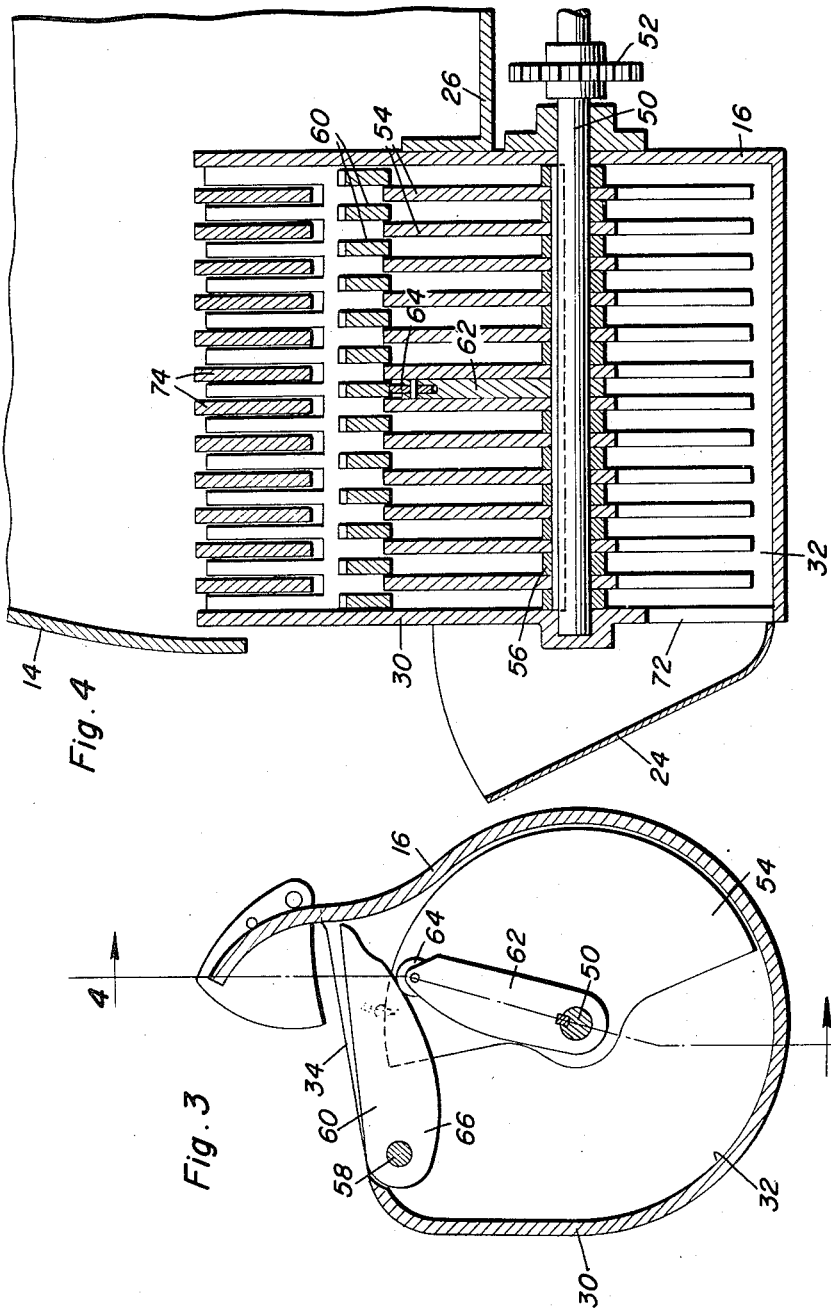
Edwin A. Schonrock
INVENTOR.

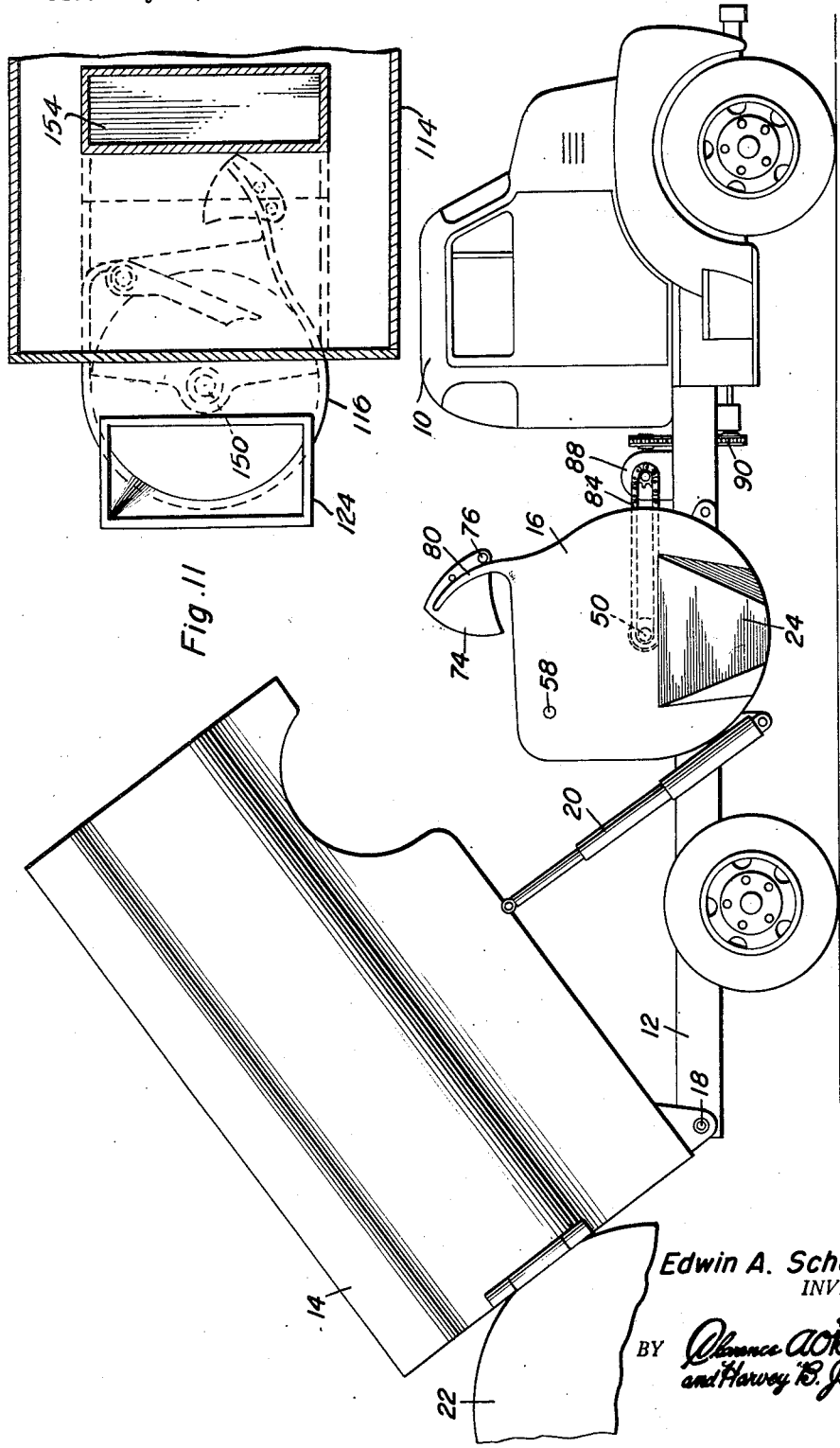

May 27, 1958 E. A. SCHONROCK 2,836,316
BULK MATERIAL COMPACTOR FOR REFUSE TRUCKS
Filed May 12, 1955 5 Sheets-Sheet 4

Edwin A. Schonrock
INVENTOR.
BY
Attorneys

May 27, 1958 E. A. SCHONROCK 2,836,316
BULK MATERIAL COMPACTOR FOR REFUSE TRUCKS
Filed May 12, 1955 5 Sheets-Sheet 5

Edwin A. Schonrock
INVENTOR.

United States Patent Office 2,836,316
Patented May 27, 1958

2,836,316
BULK MATERIAL COMPACTOR FOR REFUSE TRUCKS

Edwin A. Schonrock, San Angelo, Tex.

Application May 12, 1955, Serial No. 507,886

18 Claims. (Cl. 214—501)

This invention comprises novel and useful improvements in a bulk materials compactor and more specifically relates to a dump body having an improved coaction with a bulk material compactor for filling the same.

The primary object of this invention is to provide a dump truck or dump trailer in combination with an improved means for filling the body of the same with bulk material in a highly compacted manner whereby a much greater and more condensed load of bulk material may be economically handled by the body of the truck or trailer.

A further object of the invention is to provide a bulk material compacting means in conjunction with a dump body of a truck or trailer whereby the body may be completely filled with compacted material in a highly improved manner and without interfering with the tilting of the body for dumping or discharging the contents thereof.

Yet another important object of the invention is to provide an improved and highly advantageous arrangement of a bulk material compactor and a dump body whereby the communication between the discharge means of the compactor and the dump body may be selectively established or discontinued in an improved manner by lifting the body from its horizontal position to a dumping position and vice versa.

A still further important object of the invention is to provide an improved construction in accordance with the foregoing objects wherein the bulk material compactor unit may be carried by the supporting frame of a truck in an improved manner and may be powered from the power take-off thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a view similar to Figure 1 but showing the body in its raised or dumping position and illustrating the manner in which the body is disconnected from the compactor in its tilting and dumping operation;

Figure 3 is a vertical sectional view through the novel bulk material compactor in accordance with this invention;

Figure 4 is a view taken upon the plane indicated by the section line 4—4 of Figure 3, and showing the manner in which the dump body cooperates with the discharge means of the compactor;

Figure 11 is a fragmentary horizontal sectional view, taken substantially upon the plane indicated by the section line 11—11 of Figure 10.

Figure 1:
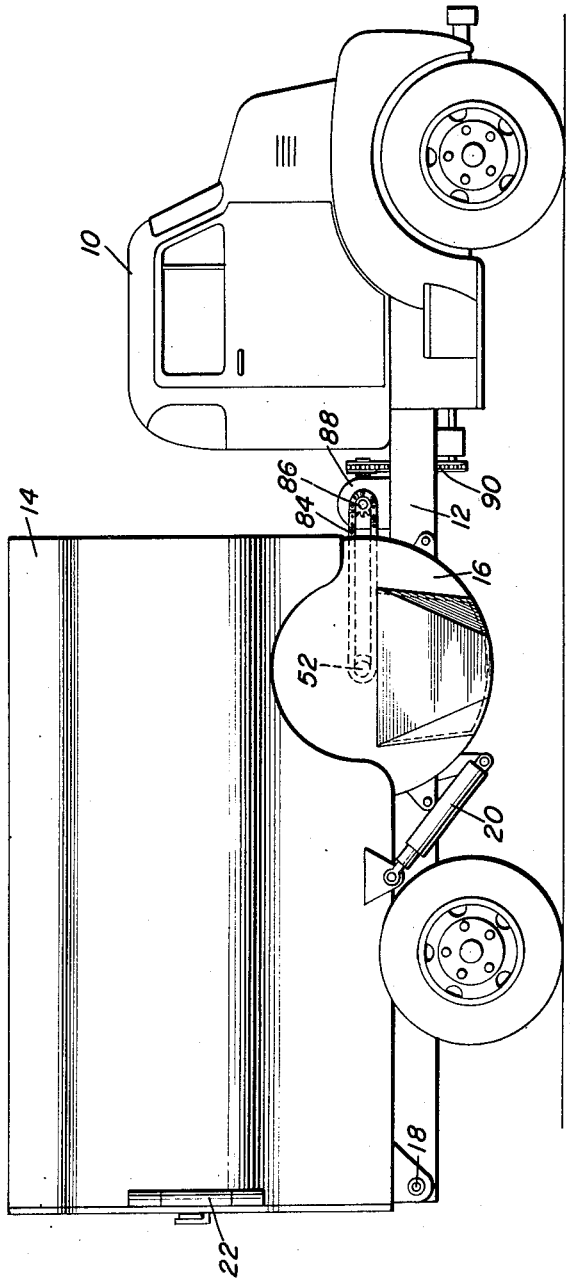
Figure 1 is a side elevational view showing by illustrating the principles of this invention, a bulk material compactor mounted upon the supporting frame of a truck in cooperative relationship with a tiltable dump body for that truck, the body being shown in its lowered and loading and load carrying position therein.

In the embodiment of Figures 1–9, there is disclosed a conventional dump truck 10 having a chassis or supporting frame 12 with a dump body 14 thereon, a compactor device being mounted upon either or both sides of the frame as shown at 16. Any convenient means may be provided for causing tilting movement of the body from its lowered, generally horizontal loading and load carrying position shown in Figure 1, and for moving the body to a sharply tilted or inclined, raised dumping position as shown in Figure 2. In the embodiment illustrated, the body is hinged to the chassis 12 at one end as by means of a pivot 18 and may be elevated or lowered as by a conventional form of lifting mechanism 20. It is to be understood however that the principles of this invention are in no way limited to any particular means for mounting the body upon the supporting framework or to the precise lifting means depicted in the drawings.

Conveniently then, see Figures 1 and 2, the body may be provided with a discharge means such as a door 22 provided in the rear end of the same.

In accordance with the present invention, the bulk material compactor unit 16 is mounted upon the supporting framework 12 in any convenient manner, and preferably adjacent the front end of the dump body. The body is designed, in its lowered position, to fit down upon, overlie and enclose the upper portion of the compactor unit 16 for a purpose which will be subsequently set forth.

Figure 9:
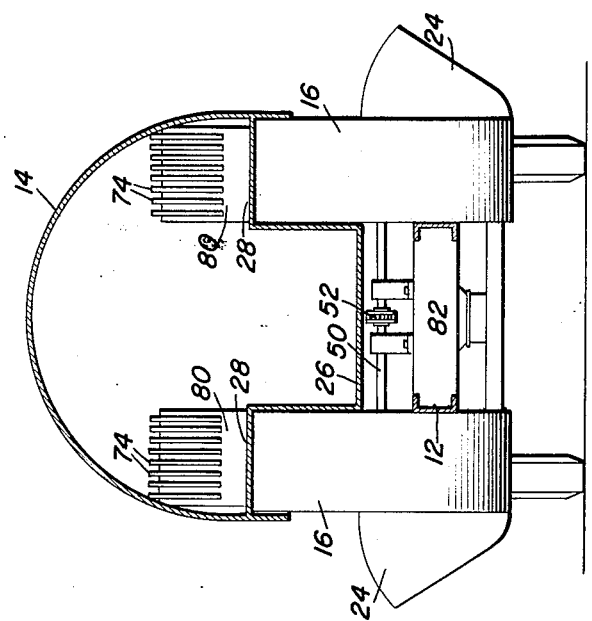
Figure 9 is a vertical transverse sectional view through a portion of the truck and dump body and illustrating the relative cooperative relationship between two compactor units and the body.

As shown in Figure 9, two such compactor units are in general provided, one being disposed on each side of the supporting frame, and each compactor unit has a laterally disposed chute or hopper 24 which extends out beyond the sides of the body and whereby loose material such as garbage or the like may be dumped into the same. Each chute or hopper 24 constitutes an inlet means for one of the compactors 16 and material after being compacted therein is pressed and discharged into the body 14 through an outlet means from the compactor which communicates with the interior of the body as set forth hereinafter. As will be apparent from Figure 9, the body has a bottom wall 26 which is provided with raised recessed portions 28 adapted to receive the upper part of the compactor units 16. Thus, the sides of the body together with the bottom of the same will partially enclose the upper portions of the compactors in the lowered position of the body.

Referring now more particularly to Figures 3–8 it will be seen that each compactor unit consists of a generally cylindrical or drum-like casing 30 having a substantially cylindrical chamber 32 therein, and the funnel or inlet means 24 communicates therewith as shown in Figure 4. Each of the compactors is provided with an outlet means whereby the loose bulk material received into the chamber 32 of the compactor from the inlet means 24, and after being compressed in the compactor is discharged therefrom. This discharge means consists of an opening or discharge passage 34 at the upper portion of the compactor.

Communicating means are provided between the body and the compactor when the body is in its lowered position; and for discontinuing communication when the body is in its raised position. This communicating means consists of openings in the raised portions 28 of the bottom wall, not shown, and which receive the upper portion of the compactor units and their outlet means. Thus there is a telescoping connection provided between the compactor units and the bottom wall of the body for the passage of material from the compactors into the body under the operation of the compacting elements. It may be observed that the fit need not be airtight, since the bulk material handled by the device is usually of such size that when pressed into the body 14 there will be no tendency of the material to escape through the relatively small clearances between the sides of the body and of the inlet opening thereinto and the outlet means of the compactor unit.

As so far described, it will be apparent that when the body is in its lowered position the communication is automatically established between the interior of the body and the compactor units whereby bulk material when dumped into the hoppers may be forced by the working elements of the compactor into the body and tightly pressed and compacted therein.

The actual construction of the compactor unit is not essential to the present invention in which the novelty disclosed and claimed resides chiefly in the provision of the tiltable dump body and its cooperation with a compacting unit whereby bulk material may be tightly compacted into the dump body. However, in order to illustrate a suitable construction of compactor and the manner in which the same cooperates with the truck body for loading the same, attention is directed to Figures 3–8. The compactor unit illustrated therein is claimed per se in my copending application Serial No. 527,332, filed August 9, 1955, for Garbage Disposal Apparatus Having Bulk Material Compactor. The compactor, as seen in Figures 3 and 4, includes a shaft 50 which is journaled in the casing 30, and preferably this shaft extends transversely across the supporting frame of the truck and serves to operate the two oppositely disposed compactor units. By means of a sprocket gear or the like 52, power is supplied to the shaft and to the compactor units as set forth hereinafter.

Figure 5:
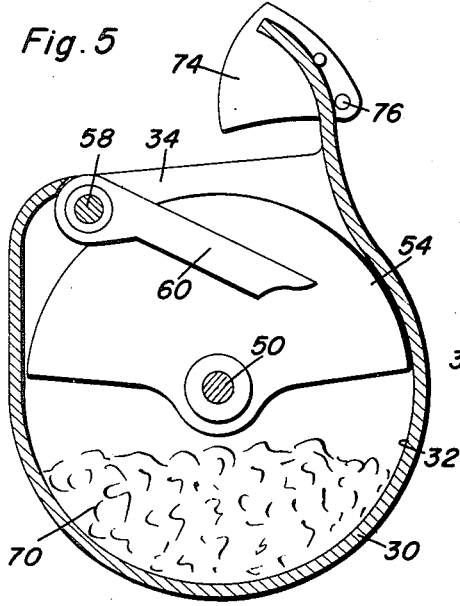
Figures 5–8 are views similar to Figure 3 but illustrating the sequence of operations of the compactor unit.
Figure 6:
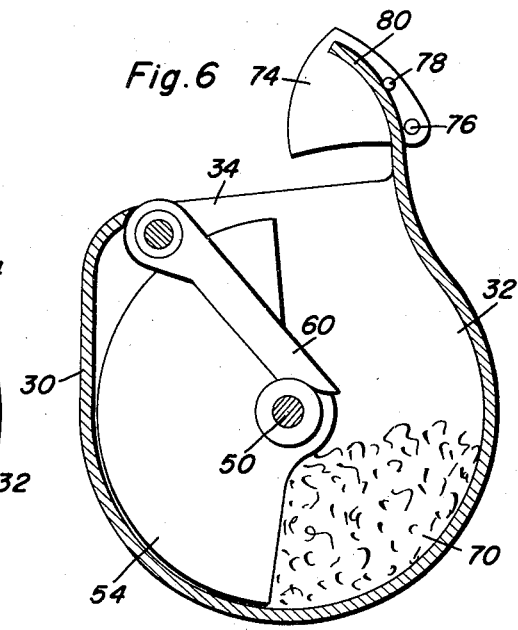
Figure 7:
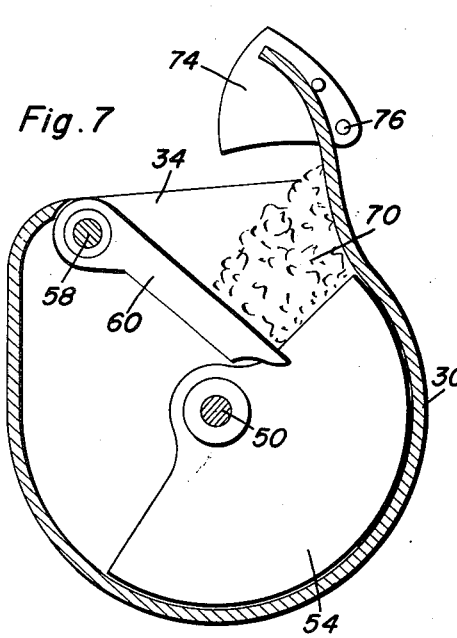

Disposed upon the shaft 50 within the chambers 32 of the compactor units are a plurality of substantially semi-circular spaced plates 54 which are spaced from each other as by spacer sleeves 56 upon the shaft. There is likewise provided in the upper portion of the chamber 32 a transverse supporting shaft 58 to which are rigidly attached a plurality of elevating or lifting fingers or blades 60 which extend across the discharge passage or opening 34 at the upper end of the compactor. An operating cam in the form of a lever 62 is rigidly secured to the actuating shaft 50, and is provided with antifriction means such as roller 64 at its outer end. The cam lever and roller cooperate with a cam surface 66 formed on one of the fingers whereby upon rotation of the cam lever 62, the finger 60 having the cam surface 66 will be vertically oscillated as will appear from Figures 5–8, carrying with it the entire set of elevated fingers in a vertically oscillatory manner. As will be noted from Figure 4, the elevating fingers 60 are staggered or interdigitated with respect to the plates 54. The operation of this mechanism will now be more readily apparent from Figures 5–8. As shown in Figure 5, a charge of loose bulk material as indicated by the numeral 70 has been fed into the chamber 32 by the hopper 24. At this time the series of plates 54 which constitute the compressing elements of the compactor are positioned as shown in Figure 5 whereby they close together with the elevator fingers 60, the outlet or discharge opening 34. As the shaft 50 is rotated, the plates move to the position shown in Figure 6, thus opening the discharge opening 34 and moving the material 70 in a counter-clockwise direction through the chamber 32. Continued movement as shown in Figure 7 now lifts the material 70 to the upper portion of the chamber and above and upon the elevating finger 60 in readiness for the further operation of Figure 8 in which the actuation of the cam lever 62 upon the cam surface 56 lifts the entire set of elevating fingers and through them forces the compacted material upwardly through the discharge opening 34 and into the interior of the body. At the time of the position shown in Figure 8 it will be observed that the plates 54 have again closed the opening 34 from the interior of the chamber 32 and the latter is now prepared to receive a further charge of material from the hopper since the plates 54 have uncovered the inlet opening 72, see Figure 4, by which the hoppers 24 communicate with the interior of the chamber 32.

In order to better prevent possible return of material after the same has been compacted into the body, there is provided a gate assembly. The latter consists of a plurality of generally triangular plates or blades 74 rigidly connected together and mounted upon a pivot shaft 76. A stop rod or pin 78 carried by the blade is adapted to rest upon an upwardly extending projection 80 of the forward wall of the casing 30 of the compactor and thus limit downward pivoting movement of the gate member to the position shown in Figures 3, 5, 6 and 7.

Figure 8:
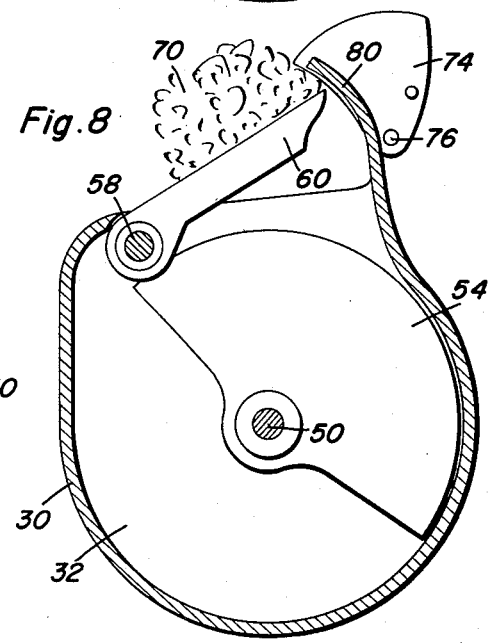

These plates 74 of the gate means are adapted to project into the discharge opening 34 and to overlie the elevating fingers 60 as will be apparent from Figure 4. Thus, when the elevating fingers are lifted, as shown in Figure 8, their outer ends will engage the plates 74 and will cause the same to pivot in a clockwise direction about their axis 76 and thus permit the elevating fingers to force the compacted material through the discharge opening. As soon as the elevating fingers have passed, gravity causes the gate means to drop back into its original position thereby obstructing return flow of the material through the discharge opening.

As above mentioned, the actual construction of the compactor, shown on Figures 3–8, is not essential to the principles of this invention and is not claimed therein. However, the coaction of the compactor with the truck body, including the coaction of the gate means which prevents return flow from the truck body into the compactor is deemed to be of importance to the invention claimed herein.

Referring now again to Figure 9, in conjunction with Figures 1 and 2, it will be seen that the transverse shaft 50 of the two compactor units is generally supported upon the supporting frame 12 at substantially the mid-portion of the same as by suitable journals 82. The sprocket gear 52 is engaged by sprocket chain 84 which in turn is operatively connected with the sprocket gear 86 of a transmission assembly 88 which is likewise mounted upon the supporting frame 12 and which is operably connected to the power take-off of the tractor as by a connecting mechanism 90. Thus, the power plant of the truck is employed to actuate the compactor units.

As will be observed from Figure 9, this arrangement permits the pair of compactor units located on opposite sides of the supporting frame to be simultaneously operated, and enables the inlet means and the hoppers 24 thereof to be disposed outwardly of the body in a convenient position for receiving loose bulk material to be compacted into the body by this invention.

Figure 10:
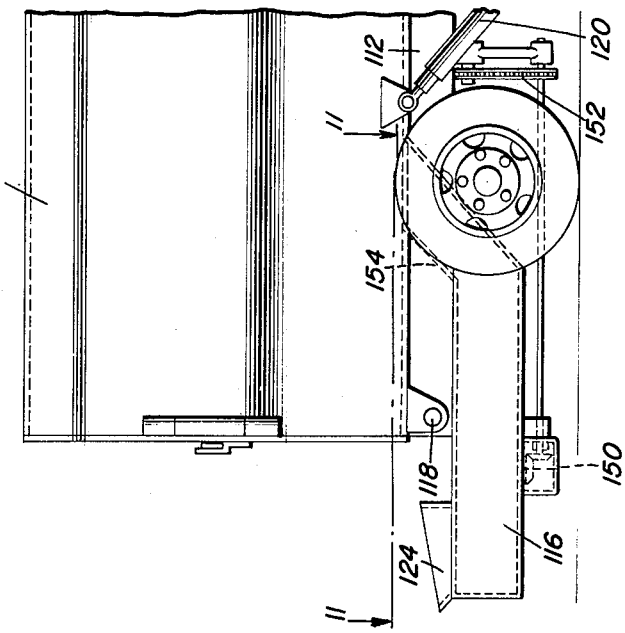
Figure 10 is a fragmentary side elevational view of the rear of a truck having a modified construction in accordance with this invention.

In the arrangement shown in Figures 1–9, it will be observed that the compactor units are placed at the forward end of the body and are embraced and overlaid by the forward end of the body when the latter is in its lowered position. Disclosed in Figures 10 and 11 is a slightly different arrangement in which a body 114 is pivotally mounted to a supporting frame 112 as by rearwardly disposed pivot pins 118. A similar lifting mechanism 120 is employed to lift the body from a lowered loading and transported position to a vertically tilted raised and dumping position similar to that shown in Figure 2. However, in this form of the invention a single compactor unit indicated generally by the numeral 116 is provided, this compactor unit being disposed with its driving shaft 150 disposed in a generally vertical position and operated by a power operating means indicated generally by the numeral 152, from the power take-off of the truck. The compactor unit 116 thus has its compressing elements mounted for rotation in a horizontal plane as compared with the rotation in a vertical plane of the previously described embodiment. The compactor 116 extends to the rear of the body 114, and below the same, and is provided with an inlet means in the form of a hopper or funnel 124 by means of which loose bulk material may be discharged and may be fed into the compactor. After being compressed in the compactor, this material is discharged into an upwardly inclined discharge opening or chute 154 into a suitable opening, not shown, in the bottom of the truck 114. It is understood that the same construction of compactor unit and the same elevating fingers and gate means previously described may be employed in this arrangement, the difference being that in the form of Figure 10 the compacting elements rotate horizontally about vertical axes and the compacted material is fed upwardly through the bottom wall of the body adjacent the rearward and central portion of the same.

In this form of the invention, when it is desired to dump or discharge the contents of the body, it will generally be necessary to provide a discharge chute from the body whereby the material may pass over or to one side of the members 116, 124.

It will be observed that for simplicity of illustration, the principles of this invention have shown as applied to a dump truck of the type wherein the dump body is firmly secured to the chassis of the truck. It is however equally within the scope of this invention to employ the principles of this invention in a tractor trailer combination in which the trailer carries the dump body and in which this body has its forward end resting upon the rear of the tractor vehicle with suitable mechanism being provided for elevating the trailer into a dumping position. The mode of operation is exactly the same, and the same basic principle prevails of the forward end of the body being in communicating registration of the discharge means of the compactor unit which is carried by the tractor vehicle when the body is in its lowered position; and in which the communication is broken or disconnected when the body is elevated in dumping position. As one example of such well known type of tractor, the trailer combination in which the trailer is elevated into a dumping position, reference is my prior Patent No. 2,661,236.

It is to be clearly understood that it is not intended to limit the principles of this invention, therefore, to a truck having a dump body thereon, but that in the claims it is intended to cover the application of this feature of the invention to both a truck having a dump body and a tractor having a dumping trailer operatively connected therewith.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bulk material compacting dump truck comprising a supporting frame, a body pivoted to said frame and tiltable from a generally horizontal lowered position for receiving and transporting bulk material into a sharply inclined raised position for dumping, means for supporting at least one end of said body upon the frame when the body is in its lowered position, a relatively stationary bulk material compactor mounted upon said frame, said compactor having inlet means for receiving loose bulk material and outlet means for discharging compacted bulk material, means for receiving said outlet means in said body and establishing communication between said outlet means and the interior of the body when the latter is in its lowered position and for discontinuing said communication when the body is in its raised position.

2. The combnation of claim 1 wherein said communicating means includes an inlet passage in said body, said outlet means and said inlet passage having slidably telescoping engagement when said body is in its lowered position.

3. The combination of claim 1 wherein said inlet means has a material receiving opening positioned at the side of the frame and laterally outwardly of the side of the body when the latter is in its lowered position.

4. The combination of claim 1 including drive means for operating said compactor from the power take-off of the truck.

5. The combination of claim 1 wherein the body overlies and at least partially surrounds the compactor in the lowered position of the body and has its front end terminating forwardly of the front end of the compactor.

6. The combination of claim 1 wherein the body overlies and at least partially surrounds the compactor in the lowered position of the body, said body having in its bottom an upwardly recessed portion for overlying and providing clearance for the compactor in the lowered position of the body, said portion having an opening communicating with the outlet means in the lowered position of the body.

7. A bulk material compacting dump truck comprising a supporting frame, a body pivoted to said frame and tiltable from a generally horizontal lowered position for receiving and transporting bulk material into a sharply inclined raised position for dumping, means for supporting at least one end of said body upon the frame when the body is in its lowered position, a pair of bulk material compactors mounted upon said frame at opposite sides thereof, each compactor having an inlet means for receiving loose bulk material and an outlet means for discharging compacted bulk material, means for receiving said outlet means in said body and establishing communication between each outlet means and the interior of said body when the latter is in its lowered position and for discontinuing said communication when the body is in its raised position.

8. The combination of claim 7 wherein said inlet means include material receiving openings disposed on opposite sides of the frame and outwardly of the body when the latter is in its lowered position.

9. The combination of claim 7 including a drive shaft extending transversely of said frame and connected with each compactor, means extending between said compactors for operating said drive shaft from the power take-off of a truck.

10. The combination of claim 7 wherein said body has a bottom overlying both of said compactors and said bottom wall has an upwardly recessed portion overlying and providing a clearance for each compactor in the lowered position of the body.

11. The combination of claim 10 wherein each portion has an opening communicating with and receiving the outlet means of one compactor in the lowered position of the body.

12. The combination of claim 1 wherein said compactor has a compression chamber and a rotatable compressing element therein, said outlet means including a discharge passage, a material feeding means in said passage for moving material compressed by said element through said passage, said communicating means including an opening in said body receiving said discharge passage.

13. A bulk material compacting dump truck comprising a supporting frame, a body pivoted to said frame and tiltable from a generally horizontal lowered position for receiving and transporting bulk material into a sharply inclined raised position for dumping means for supporting at least one end of said body upon the frame when the body is in its lowered position, a relatively stationary bulk material compactor mounted upon said frame, said compactor having inlet means for receiving loose bulk material and outlet means for discharging compacted bulk material, means for receiving said outlet means in said body and establishing communication between said outlet means and the interior of the body when the latter is in its lowered position and for discontinuing said communication when the body is in its raised position, said compactor having a compression chamber and a rotatable compressing element therein, said outlet means including a discharge passage, a material feeding means in said passage for moving material compressed by said element through said passage, said communicating means including an opening in said body receiving said discharge passage, a gate pivoted in said discharge passage and actuated by said material feeding means and adjacent the exit thereof for preventing return of material from said exit into said discharge passage.

14. The combination of claim 7 wherein said compactor has a compression chamber and a rotatable compressing element therein, said outlet means including a discharge passage, a material feeding means in said passage for moving material compressed by said element through said passage, said communicating means including an opening in said body receiving said discharge passage.

15. A bulk material compacting dump truck comprising a supporting frame, a body pivoted upon said frame and tiltable from a generally horizontal lowered position for receiving and transporting bulk material into a sharply inclined raised position for dumping, means for supporting at least one end of said body upon the frame when the body is in its lowered position, a pair of bulk material compactors mounted upon said frame at opposite sides thereof, each compactor having an inlet means for receiving loose bulk material and an outlet means for discharging compacted bulk material, means for receiving said outlet means in said body and establishing communication between each outlet means and the interior of said body when the latter is in its lowered position and for discontinuing said communication when the body is in its raised position, said compactor having a compression chamber and a rotatable compressing element therein, said outlet means including a discharge passage, a material feeding means in said passage for moving the material compressed by said element through said passage, said communicating means including an opening in said body receiving said discharge passage, a gate pivoted in said discharge passage and adjacent the exit thereof for preventing return of material from said exit into said discharge passage.

16. The combination of claim 1 wherein said compactor and inlet means are positioned at the front end of said body.

17. The combination of claim 7 wherein said compactors and inlet means are disposed at the front end of the body.

18. The combination of claim 1 wherein said compactor is adjacent the rear end of the body and said inlet means extends to the rear of the body.

References Cited in the file of this patent

UNITED STATES PATENTS

| | | |
|---|---|---|
| 1,344,047 | Le Page | June 22, 1920 |
| 1,721,400 | Le Page | July 16, 1929 |
| 2,050,806 | Rey | Aug. 11, 1936 |
| 2,207,675 | Arey | July 9, 1940 |
| 2,487,411 | Balbi | Nov. 8, 1949 |
| 2,488,657 | Biszantz et al. | Nov. 22, 1949 |
| 2,622,748 | Feidert | Dec. 23, 1952 |

FOREIGN PATENTS

| | | |
|---|---|---|
| 516,957 | Germany | Jan. 31, 1931 |
| 792,162 | France | Oct. 14, 1935 |